(12) United States Patent
Dusan et al.

(10) Patent No.: US 9,886,966 B2
(45) Date of Patent: Feb. 6, 2018

(54) SYSTEM AND METHOD FOR IMPROVING NOISE SUPPRESSION USING LOGISTIC FUNCTION AND A SUPPRESSION TARGET VALUE FOR AUTOMATIC SPEECH RECOGNITION

(71) Applicant: Apple Inc., Cupertino, CA (US)

(72) Inventors: Sorin V. Dusan, San Jose, CA (US); Aram M. Lindahl, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 82 days.

(21) Appl. No.: 14/536,269

(22) Filed: Nov. 7, 2014

(65) Prior Publication Data

US 2016/0133269 A1 May 12, 2016

(51) Int. Cl.
*G10L 15/00* (2013.01)
*B25J 5/00* (2006.01)
*H04N 7/14* (2006.01)
*G10L 21/00* (2013.01)
*H04M 1/00* (2006.01)
*G10L 21/0208* (2013.01)
*G10L 15/20* (2006.01)
*H04N 7/15* (2006.01)
*B25J 13/00* (2006.01)

(52) U.S. Cl.
CPC .......... *G10L 21/0208* (2013.01); *G10L 15/20* (2013.01); *B25J 13/00* (2013.01); *H04N 7/15* (2013.01)

(58) Field of Classification Search
CPC ..... G10L 21/0208; G10L 25/48; G10L 15/20; B25J 13/00; H04N 7/15

USPC ......................................................... 704/226
See application file for complete search history.

(56) References Cited

U.S. PATENT DOCUMENTS

| 6,001,131 A | 12/1999 | Raman |
| 6,122,384 A | 9/2000 | Mauro |
| 6,230,122 B1 | 5/2001 | Wu et al. |
| 7,171,246 B2 | 1/2007 | Mattila et al. |

(Continued)

OTHER PUBLICATIONS

"Deep Neural Networks for Acoustic Modeling in Speech Recognition", Geoffrey Hinton et al., 1053-5888/12/$31.00© 2012 IEEE, IEEE Signal Processing Magazine 82, Nov. 2012.*

*Primary Examiner* — Farzad Kazeminezhad
(74) *Attorney, Agent, or Firm* — Blakely Sokoloff Taylor & Zafman LLP

(57) ABSTRACT

Method for improving noise suppression for ASR starts with a microphone receiving an audio signal including speech signal and noise signal. In each frame for frequency band of audio signal, a noise estimator detects ambient noise level and generates noise estimate value based on estimated ambient noise level, variable noise suppression target controller generates suppression target value using noise estimate value and logistic function, a gain value calculator generates a gain value based on suppression target value and noise estimate value, and combiner enhances the audio signal by the gain value to generate a clean audio signal in each frame for all frequency bands. Logistic function models desired noise suppression level that varies based on ambient noise level. Variable level of noise suppression includes low attenuation for low noise levels and progressively higher attenuation for higher noise level. Other embodiments are also described.

20 Claims, 7 Drawing Sheets

(56) References Cited

U.S. PATENT DOCUMENTS

| | | | | |
|---|---|---|---|---|
| 8,577,675 B2* | 11/2013 | Jelinek | ............... | G10L 21/0208 379/392.01 |
| 2004/0104702 A1* | 6/2004 | Nakadai | ................... | B25J 13/00 318/568.12 |
| 2004/0186716 A1* | 9/2004 | Morfitt, III | ............. | G10L 25/48 704/236 |
| 2005/0240401 A1* | 10/2005 | Ebenezer | ............ | G10L 21/0208 704/226 |
| 2010/0094625 A1* | 4/2010 | Mohammad | ............ | G10L 25/48 704/233 |
| 2015/0109404 A1* | 4/2015 | Sun | ......................... | H04N 7/15 348/14.08 |

* cited by examiner

SYSTEM AND METHOD FOR IMPROVING NOISE SUPPRESSION USING LOGISTIC FUNCTION AND A SUPPRESSION TARGET VALUE FOR AUTOMATIC SPEECH RECOGNITION

FIELD

An embodiment of the invention relate generally to a method of improving the noise suppression for automatic speech recognition by using a logistic function that models a desired level of noise suppression which varies based on ambient noise level.

BACKGROUND

Currently, a number of consumer electronic devices are adapted to receive speech via microphone ports or headsets. Typical examples of consumer electronic devices include a portable telecommunications device (mobile telephone), desktop computers, laptop computers, and tablet computers. The consumer electronic devices may also include automatic speech recognition (ASR) capabilities that process the received speech.

When using these electronic devices, however, a common complaint is that the speech captured by the microphone port or the headset includes environmental noise such as secondary speakers in the background or other background noises. This environmental noise often renders the user's speech unintelligible and thus, degrades the accuracy of the ASR.

SUMMARY

While noise reduction techniques, such as spectral subtraction and noise suppression, are applied to microphone signals before the signals are processed by automatic speech recognition (ASR) engine (or processor or controller) in an effort to reduce the environmental noise from the audio signal, the current noise reduction techniques degrade the accuracy of the ASR at high signal-to-noise ratios (SNR) (e.g., above 12 or 15 db SNR). Generally, the present invention relates to an electronic device, system and method for improving noise suppression for automatic speech recognition (ASR) by using a logistic function that models a desired level of noise suppression, which is ambient noise level dependent.

In one embodiment of the invention, a method for improving noise suppression for automatic speech recognition (ASR) is using a logistic function that models a desired level of noise suppression that varies based on ambient noise level. The method starts with at least one microphone receiving an audio signal that includes a speech signal and a noise signal. In each frame or in each frequency band of the audio signal, a noise estimator may then detect a level of ambient noise and generate a noise estimate value based on the estimated level of ambient noise. In each frame or in each frequency band of the audio signal, a suppression target controller may then generate a suppression target value by using the noise estimate value as well as the logistic function that models a desired level of noise suppression that varies based on the ambient noise level. The variable level of noise suppression may include a low attenuation for low noise levels and a progressively higher attenuation for higher noise level. In each frame or in each frequency band of the audio signal, a gain value calculator may then generate a gain value based on the suppression target value and the noise estimate value. A combiner may then enhance the audio signal by multiplying with gains usually smaller than one to generate a clean audio signal for the frame or for the frequency band.

In another embodiment, a non-transitory computer-readable storage medium has stored thereon instructions, which when executed by a processor, causes the processor to perform a method for improving noise suppression for automatic speech recognition (ASR). The method starts by receiving an audio signal including a speech signal and a noise signal. In each frame or in each frequency band of the audio signal, the processor (i) detects a level of ambient noise and generates a noise estimate value based on the estimated level of ambient noise, (ii) generates a suppression target value using the noise estimate value and a logistic function that models a desired level of noise suppression that varies based on the ambient noise level, (iii) generates a gain value based on the suppression target value and the noise estimate value. The variable level of noise suppression may include low attenuation for low noise levels and progressively higher attenuation for higher noise level. The processor may also enhance the audio signal by the gain value to generate a clean audio signal for the frame or for the frequency band.

In yet another embodiment, a system for improving noise suppression for automatic speech recognition (ASR). The system comprises a noise estimator, a variable noise suppression target controller, a gain calculator, and a combiner. The noise estimator may estimate a level of ambient noise for each frame or for each frequency band of an audio signal, and may generate a noise estimate value for each frame or for each frequency band of the audio signal based on the estimated level of ambient noise. The audio signal may include a speech signal. The variable noise suppression target controller may generate a suppression target value for each frame or for each frequency band of the audio signal using the noise estimate value and a logistic function that models a desired level of noise suppression that varies based on the ambient noise level. The variable level of noise suppression includes low attenuation for low noise levels and progressively higher attenuation for higher noise level. The gain calculator may generate a gain value for each frame or for each frequency band of the audio signal based on the suppression target value and the noise estimate value. The combiner may enhance the audio signal for each frame or for each frequency by the corresponding gain value to generate a clean audio output signal for each frame or for each frequency. In some embodiments, the system further comprises a signal splitter to receive the audio signal from the at least one microphone, and to split the audio signal into a plurality of frames or plurality of frequency bands. In this embodiment, the system further comprises a signal synthesizer to combine the clean audio signals for each frame or for each frequency to generate a clean audio output signal for ASR processing. In one embodiment, the system includes at least one beamformer coupled to the at least one microphone, respectively, to receive the audio signal from the at least one microphone, respectively, and to output a main speech signal. An amplifier may be coupled to the beamformer and the signal splitter to receive and amplify the main speech signal from the beamformer, and to output an amplified main speech signal to the signal splitter. In some embodiments, the system further comprises an automatic speech recognition (ASR) controller to receive the clean audio output signal from the signal synthesizer and to perform ASR on the clean audio output signal.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
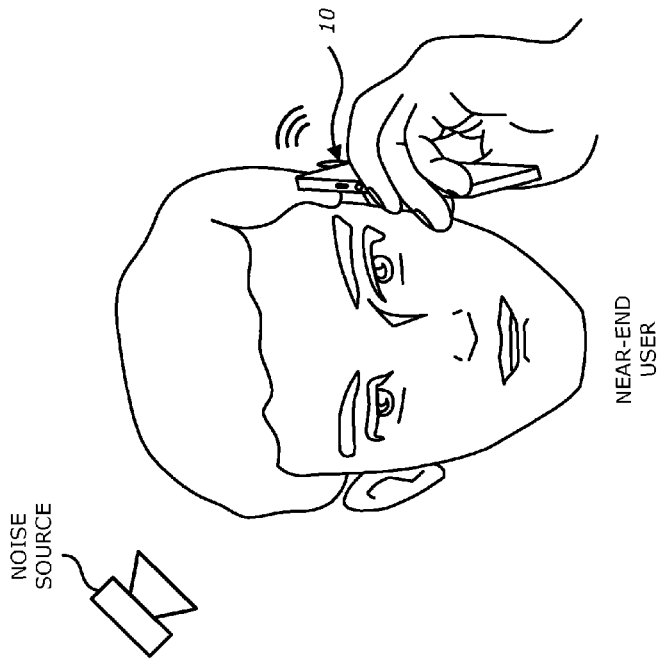
FIG. 1 illustrates an example of the headset in use according to one embodiment of the invention.
Figure 1:
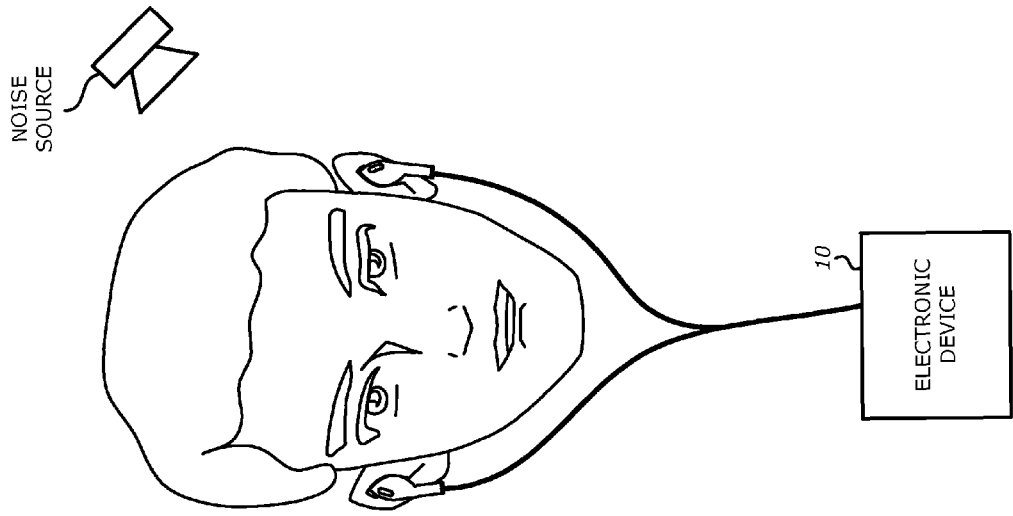

FIG. 1 illustrates an example of the headset in use according to one embodiment of the invention. In FIG. 1, the electronic device 10 is illustrated as a mobile communication device such as a mobile telephone device or a smart phone. However, it is understood that the electronic device 10 may be other personal consumer electronic devices such as computers, laptops, and tablet computers, as described in FIG. 6 below. As shown in FIG. 1, the user may hold the electronic device 10 to his ear (i.e., at-ear position) and the microphones in the electronic device 10 may receive his speech. The microphones may be air interface sound pickup devices that convert sound into an electrical signal. In some embodiments, the user may use a headset that includes a pair of earbuds and a headset wire. The user may place one or both the earbuds into his ears and the microphones in the headset may receive his speech. In still other embodiments, for instance speakerphone use case, the device may be at a significant distance from the user: at arm's length, on a table, and so forth. As the user is using the microphones included in the electronic device 10 or in the headset to transmit his speech, environmental noise may also be present (e.g., noise sources in FIG. 1). Additionally, embodiments of the invention may also use other types of headsets.

Figure 2:
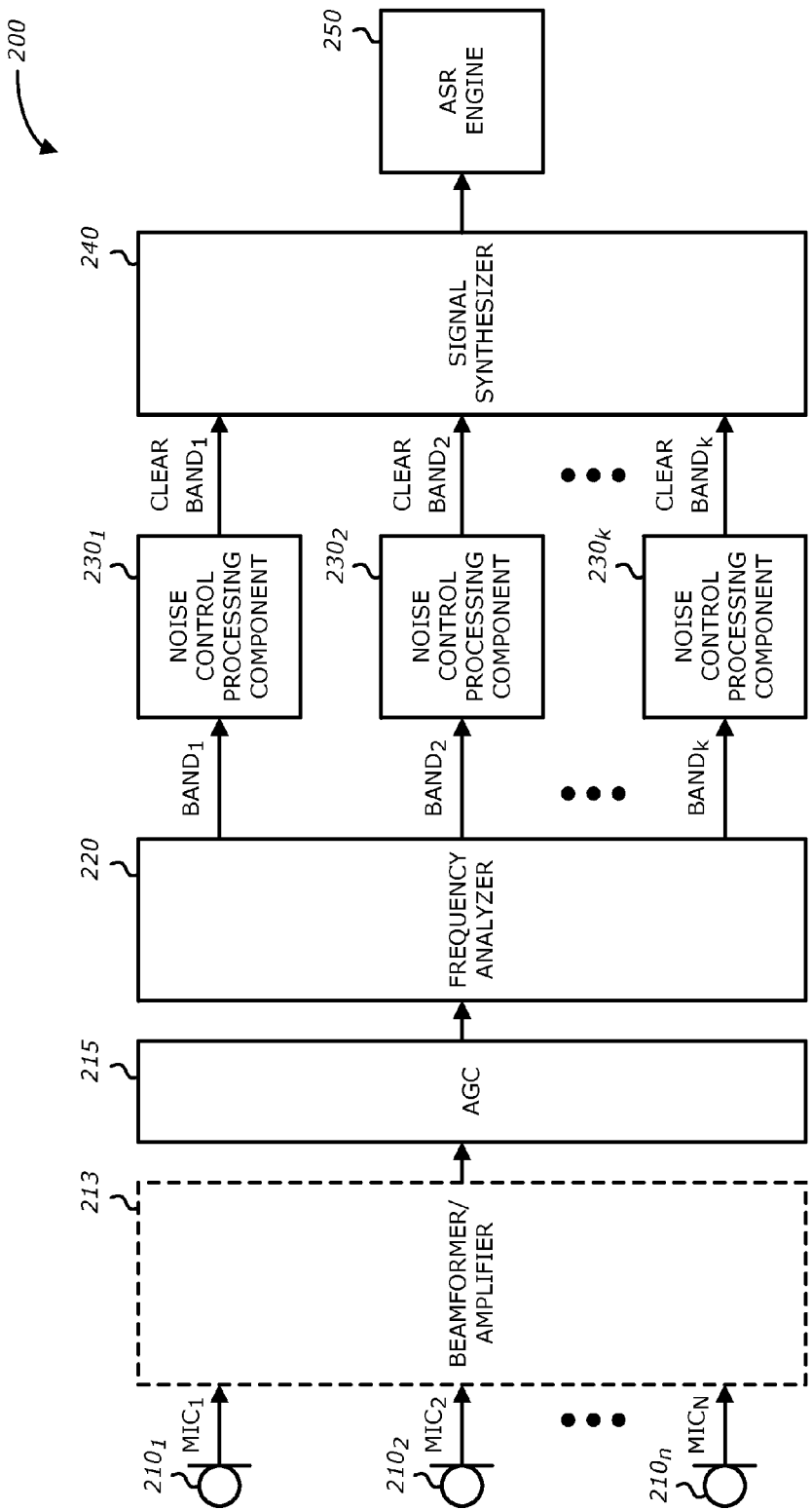
FIG. 2 illustrates a block diagram of a system for improving noise suppression for automatic speech recognition (ASR) according to one embodiment of the invention.

FIG. 2 illustrates a block diagram of a system for improving noise suppression for automatic speech recognition (ASR) according to one embodiment of the invention. The system 200 may be included in the electronic device 10. The system 200 includes at least one of a plurality of microphones $210_1$-$210_N$ (N>1), an optional beamformer 213, an automatic gain control (AGC) 215, a frequency analyzer 220, a plurality of noise control processing components $230_1$-$230_k$ (k>1), a signal synthesizer 240, and an automatic speech recognition (ASR) engine 250.

The microphones $210_1$-$210_N$ are air interface sound pickup devices that convert sound into an electrical signal. The microphones $210_1$-$210_N$ pick up the acoustic signals corresponding to a main speech signal (e.g., user's voice) as well as ambient noise or environmental noise. The microphones $210_1$-$210_N$ may also be distributed, for instance, along the headset wire, to form one or more microphone arrays. The microphone arrays may be used to create microphone array beams (i.e., beamformers), which can be steered to a given direction by emphasizing and deemphasizing selected microphones $210_1$-$210_N$. In one embodiment, the system 200 includes at least one beamformer 213 coupled to at least two microphones to receive the audio signal from the at least two microphones, and to output a main speech signal. In one embodiment, the system 200 also includes an amplifier that is coupled to the beamformer, a beramformer 213, an automatic gain control (AGC) 215, and a frequency analyzer 220. The amplifier receives and amplifies the main speech signal from the at least one microphone or one beamformer. The amplifier may output an amplified main speech signal to the frequency analyzer 220. Similarly, the microphone arrays can also exhibit or provide nulls in other given directions. Accordingly, the beamforming process, also referred to as spatial filtering, may be a signal processing technique using the microphone array for directional sound reception.

As shown in FIG. 2, the AGC 215 module is coupled to the beamformer 213, which is coupled to the microphones $210_1$-$210_N$. In another embodiment, the AGC module 215 is coupled directly to one of the microphones $210_1$-$210_N$. The AGC module 215 may receive the acoustic audio signal from at least one of the microphones $210_1$-$210_N$ or from the beamformer and splits the audio signal into a plurality frequency bands (band$_1$-band$_k$) (k>1) in each short frame (or window) of time. In the frequency domain, the frequency analyzer 220 may be a filter bank that uses Fast Fourier Transforms (FFT) to split the audio signal into the frequency bands (band$_1$-band$_k$).

The audio signals in each frame for each of the frequency bands are received by a plurality of noise control processing components $230_1$-$230_k$ (k>1), respectively. In some embodiments, the noise control processing components $230_1$-$230_k$ may be combined and include common components used to process the audio signals in each frame for each of the frequency bands. The noise control processing components $230_1$-$230_k$ respectively process the audio signals in each of the frames for each of the frequency bands to reduce the noise therein and respectively output clean audio signals in each of the frames for each of the frequency bands. The clean audio signals in each of the frames for each of the frequency bands are received by a signal synthesizer 240 that combines the clean audio signals in each of the frames for each of the frequency bands to generate a clean output audio signal for ASR processing. In the frequency domain, the signal synthesizer 240 may be a filter bank that applies inverse FFTs to synthesize clean audio signals from all of the frequency bands into a clean output audio signal. The automatic speech recognition (ASR) engine 250 may receive the clean output audio signal from the signal synthesizer 240 and performs ASR on the clean audio output. The ASR engine 250 may translate the user's speech included in the clean audio output into text inputs.

Figure 3A:
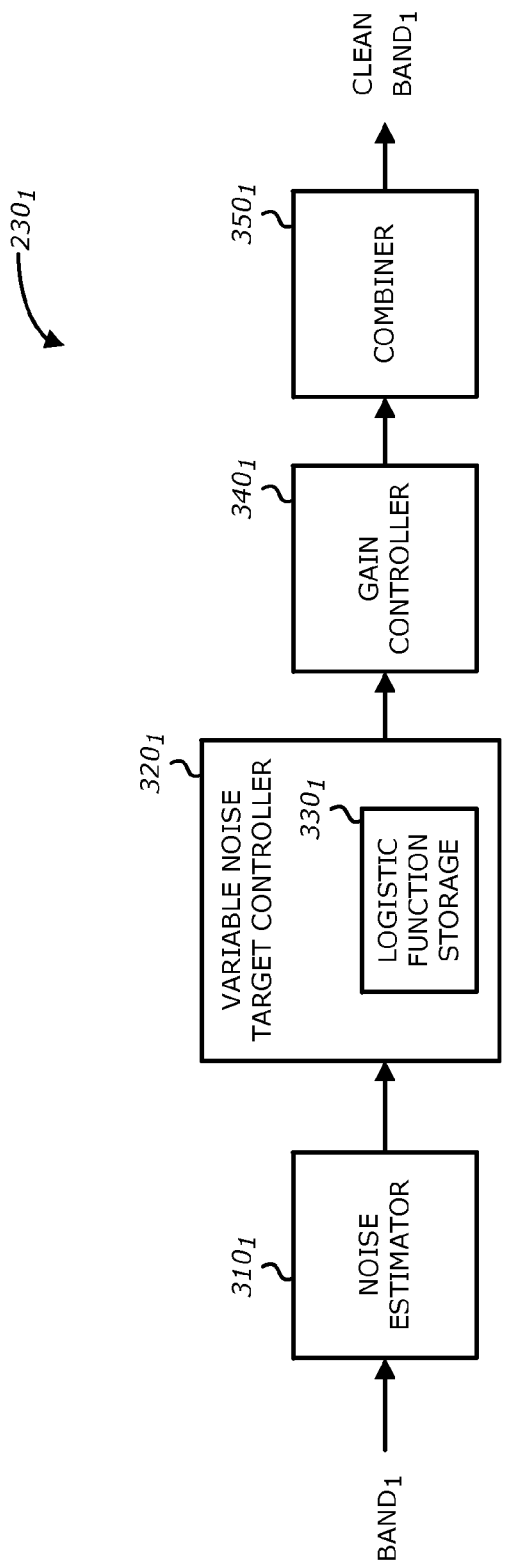
FIGS. 3A-B illustrate block diagrams of the details of one of the noise control processing components in the system for improving noise suppression for ASR according to one embodiment of the invention (FIG. 3A) and the details of the noise control processing components including a common variable noise target controller component in the system for improving noise suppression for ASR according to one embodiment of the invention (FIG. 3B).
Figure 3B:
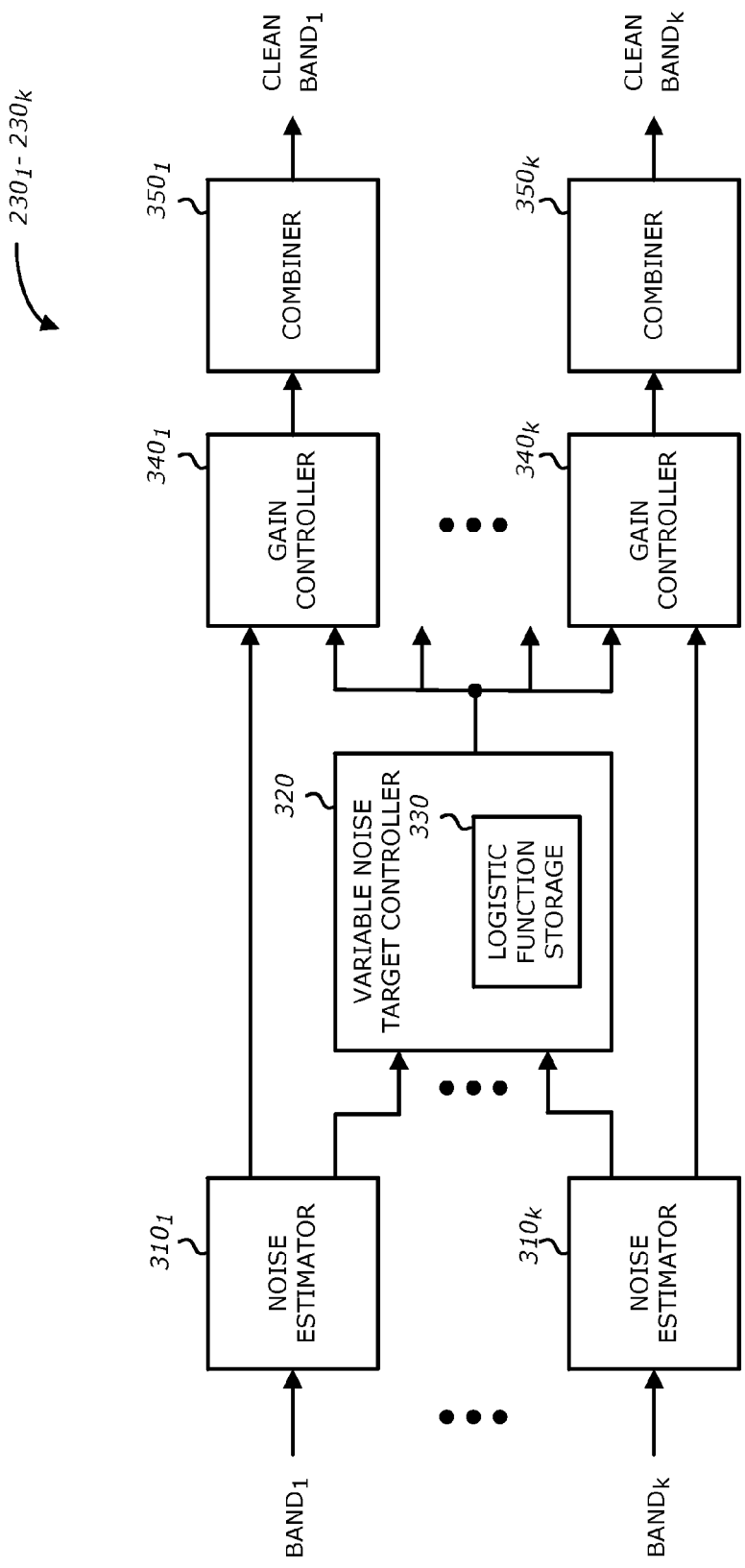

FIG. 3A illustrates a block diagram of the details of one of the noise control processing components $230_1$ in the system 200 for improving noise suppression for ASR according to one embodiment of the invention. It is understood that each of the plurality of noise control processing components $230_1$-$230_k$ may include similar components that function similarly. As shown in FIG. 3A, the noise control processing component $230_1$ includes a noise estimator $310_1$, a variable noise target controller $320_1$, a gain controller $340_1$ and a combiner $350_1$. The noise estimator $310_1$ receives the audio signal in a first band (band$_1$) for each of the frames. The audio signal includes a speech signal and may include noise. The noise estimator $310_1$ estimates a level of ambient noise for the current frame in the first frequency band (band$_1$) of an audio signal and generates a noise estimate value for the current frame for the first frequency band of the audio signal based on the estimated level of ambient noise. FIG. 3B illustrates a block diagram of the details of the noise control processing components $230_1$-$230_k$ which have a common variable noise target controller 320 in the system 200 for improving noise suppression for ASR according to one embodiment of the invention. The common variable noise target controller 320 may sum or average the estimated noises from all the frequency bands. It is understood that each of the plurality of noise control processing components $230_1$-$230_k$ may include similar components (e.g., noise estimator $310_1$-$310_k$, gain controller $340_1$-$340_k$, combiner $350_1$-$350_k$) that function similarly and that are coupled to a single common variable noise target controller 320. In some embodiments, each of the noise control processing components $230_1$-$230_k$ includes same common variable noise target controller 320 as illustrated in FIG. 3B. As shown in FIG. 3B, the noise control processing component $230_1$-$230_k$ includes a noise estimator $310_1$-$310_k$, a single (common) variable noise target controller 320 which sums or averages the noise estimates from all frequency bands, a gain controller $340_1$-$340_k$ and a combiner $350_1$-$350_k$. The noise estimators $310_1$-$310_k$ receive the audio signal in the bands (band$_1$-band$_k$) for each of the frames, respectively. The audio signal includes a speech signal and may include noise. The noise estimator $310_1$-$310_k$ estimates a level of ambient noise for the current frame in each frequency band (band$_1$-band$_k$) of an audio signal and generates a noise estimate value for the current frame for each of the frequency bands of the audio signal based on the estimated level of ambient noise. The noise estimators from all the frequency bands are combined into a single noise estimator in the common variable noise target controller 320, which generates the same suppression target for all of the frequency bands. This common suppression target represents the maximum possible suppression and it is different from the actual suppression applied in each band by the gain combiner.

In one embodiment, the noise estimator $310_1$ may be a one-channel or a two-channel noise estimator. Referring to FIG. 2, when only one microphone $210_1$ is being used to transmit audio signals on one channel to the noise control processing component $230_1$, the noise estimator $310_1$ may be a one-channel noise estimator that is a conventional single-channel or 1-mic noise estimator that is typically used with 1-mic or single-channel noise suppression systems. In such a system, the attenuation that is applied in the hope of suppressing noise (and not speech) may be viewed as a time varying filter that applies a time varying gain (attenuation) vector, to the single, noisy input channel, in the frequency domain. Typically, such a gain vector is based to a large extent on Wiener theory and is a function of the signal to noise ratio (SNR) estimate in each frequency bin. To achieve noise suppression, bins with low SNR are attenuated while those with high SNR are passed through unaltered, according to a well-known gain versus SNR curve. Such a technique tends to work well for stationary noise such as fan noise, far field crowd noise, or other relatively uniform acoustic disturbance. Non-stationary and transient noises, however, pose a significant challenge, which may be better addressed by embodiments that also include the two-channel noise estimator, which may be a more aggressive 2-mic estimator.

When there are at least two microphones $210_1$-$210_N$ being used, the outputs from each of the microphones $210_1$-$210_N$ may respectively correspond to a channel such that noise estimator $310_1$ may be a two-channel noise estimator. In other words, when there are two audio or recorded sound channels, for use by various component blocks in the system 200, each of these channels carries the audio signal from a respective one of the microphones $210_1$-$210_N$. In the embodiment where beamformers are used, a voice beamformer (not shown) and a noise beamformer (not shown) may receive both the audio signals from the microphones $210_1$-$210_N$. The voice beamformer and the noise beamformer perform beamforming to combine the audio signals from the microphones $210_1$-$210_N$ to generate a voice beamformer signal and a noise beamformer signal, respectively. The voice beamformer (VB) signal and the noise beamformer (NB) signal are transmitted to noise estimator $310_1$. It is noted that in embodiments where beamforming is not used, the voice beamformer and the noise beamformer are not included in the system 200 such that the audio signals from the microphones $210_1$-$210_N$ are directly inputted into the noise estimator $310_1$.

In another embodiment, the noise estimator 310 may include both the one-channel and a two-channel noise estimator. In this embodiment, the noise estimator 310 may also include a comparator and a selector to determine whether the one-channel or the two-channel noise estimator is to be used. In one embodiment, the one-channel noise estimator receives the VB signal from the voice beamformer while the two-channel noise estimator receives both the VB signal from the voice beamformer and the NB signal from the noise beamformer. It is noted that in embodiments where beamforming is not used, the noise estimators are respectively a 2-mic noise estimator and a 1-mic noise estimator.

In one embodiment, the two-channel and the one-channel noise estimators included in the noise estimator $310_1$ may operate in parallel and generate their respective noise estimates by processing the audio signals received. In one instance, the two-channel noise estimator is more aggressive than the one-channel noise estimator in that it is more likely to generate a greater noise estimate, while the microphones are picking up a user's speech and background acoustic noise during a mobile phone call.

In another embodiment, the one-channel noise estimator is primarily a stationary noise estimator, whereas the two-channel noise estimator can do both stationary and non-stationary noise estimation. The two-channel noise estimator and one-channel noise estimator may also operate in parallel, where the term "parallel" here means that the sampling intervals or frames over which the audio signals are processed have to, for the most part, overlap in terms of absolute time. In one embodiment, the noise estimates produced by the two-channel noise estimator and the one-channel noise estimator are respective noise estimate vectors, where the vectors have several spectral noise estimate components, each being a value associated with a different audio frequency bin. This is based on a frequency domain representation of the discrete time audio signal, within a given time interval or frame.

Figure 4:
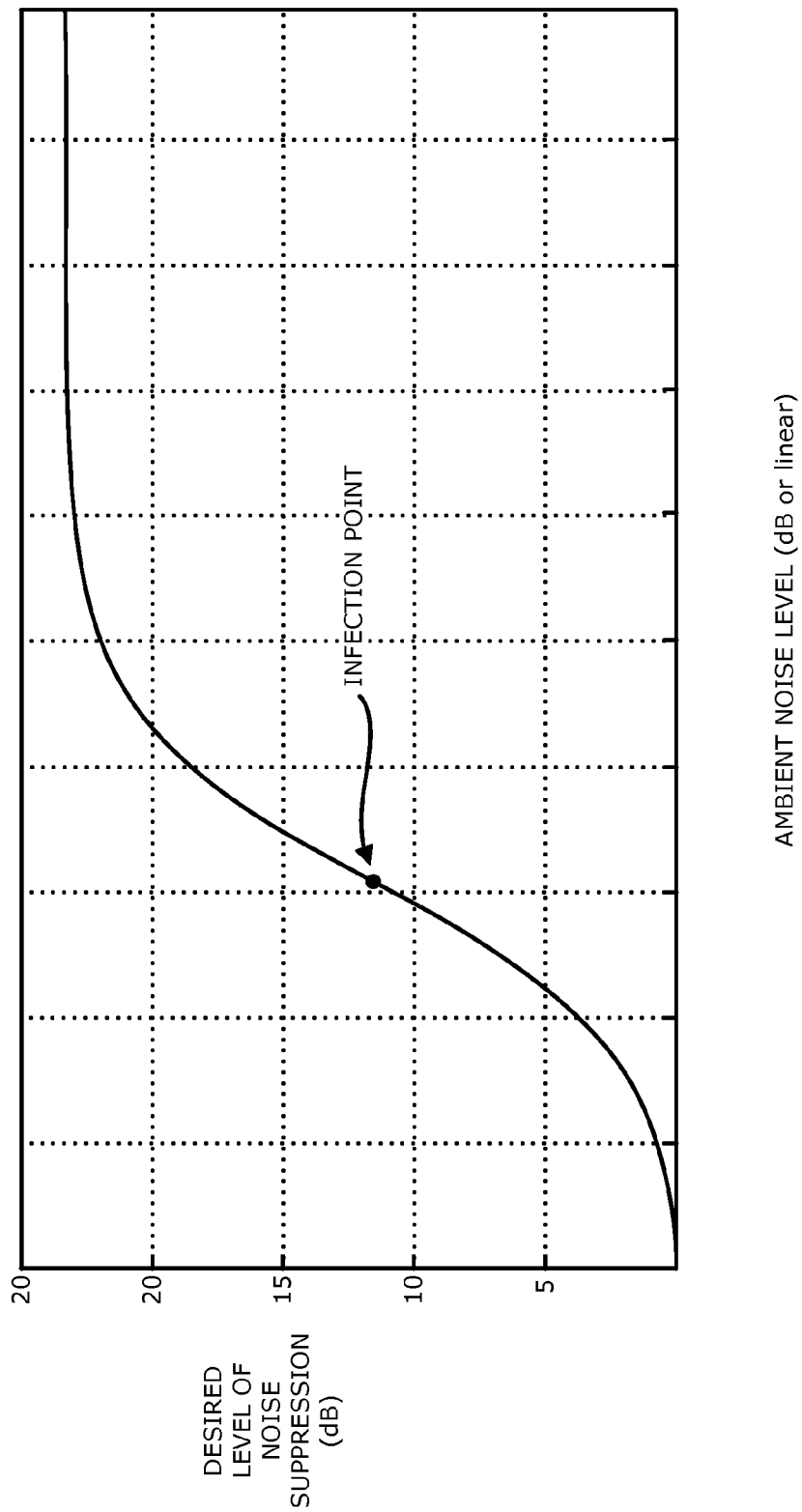
FIG. 4 illustrates a graph illustrating a logistic function that models a desired level of noise suppression (dB) that varies based on ambient noise power level (dB) according to one embodiment of the invention.

Referring back to FIG. 3A, the noise estimator $310_1$ estimates a level of ambient noise for the current frame for the first frequency band (band$_1$) of an audio signal and generates a noise estimate value for the current frame for the first frequency band of the audio signal based on the estimated level of ambient noise. A variable noise target controller $320_1$ receives the noise estimate value for the current frame for the first frequency band of the audio signal from the noise estimator $310_1$. The variable noise target controller $320_1$ may include a logistic function storage 330 that may include one or more different types of storage such as hard disk drive storage, nonvolatile memory, and volatile memory such as dynamic random access memory. The logistic function storage 330 may store a logistic function that models the level of noise suppression that varies based on the ambient noise level. Referring to FIG. 4, one embodiment of a graph illustrating an example of a logistic function that models a desired level of noise suppression (dB) that varies based on the ambient noise power level, either logarithmic [dB] or linear is illustrated.

As shown in FIG. 4, the variable level of noise suppression includes low attenuation for low noise levels and progressively higher attenuation for higher noise level. In one embodiment, the inflection point is in the middle (12 dB) of the maximum suppression target specified (e.g. 24 dB). The logistic function may also model the variable multiplication factor for spectral subtraction. In other embodiments, in lieu of the logistic function, a linear function or a look up table approximation a different function may be used to provide very low attenuation for low noise levels and a progressively higher attenuation for higher noise levels.

The variable noise suppression target controller $320_1$ may receive the noise estimate value (e.g., x-axis in FIG. 4) from the noise estimator $310_1$ and uses the logistic function to determine the suppression target value (e.g., y-axis in FIG. 4). The variable noise suppression target controller $320_1$ thus generates the suppression target value the current frame for the first frequency band (band$_1$) of the audio signal and transmits the suppression target value to the gain controller $340_1$.

In one embodiment, different types of functions (or different logistic functions) may be used for different types of noises estimated in each frame or in each frequency band. In this embodiment, the variable noise suppression target controller $320_1$ includes a noise frame classification component that determines the type of noise estimate and associates a specific type of function (or a specific logistic function) with the type of noise estimate determined. Based on the type of noise estimate, the variable noise suppression target controller $320_1$ applies the associated type of function or logistic function to obtain the suppression value.

Referring back to FIG. 3, the gain controller $340_1$ receives the suppression target value for the current frame for the first frequency band (band$_1$) from the variable noise target controller $340_1$ and the noise estimate value for the current frame for the first frequency band (band$_1$) from the noise estimator $310_1$. The gain controller $340_1$ generates a gain value for the current frame for the first frequency band (band$_1$) of the audio signal based on the suppression target value and the noise estimate value. The combiner 350 receives for the current frame the first frequency band (band$_1$) of the audio signal from the frequency analyzer 220 and the gain value for the current frame for the first frequency band (band$_1$) from the gain controller $340_1$. The combiner 350 enhances the audio signal in the current frame for the first frequency band (band$_1$) by the gain value from the gain controller $340_1$ to generate a clean audio output signal for the current frame for first frequency band (band$_1$). Referring back to FIG. 2, the outputs of each of the noise control processing components $230_1$-$230_k$ are clean audio output signal for each of the current frame for each of the frequency bands (band$_1$-band$_k$), respectively.

In one embodiment, the noise control processing component $230_1$ applies noise reduction methods based on spectral subtraction. In this embodiment, the noise control processing component $230_1$ applies a variable multiplication factor to the estimated noise to be subtracted. The variable multiplication factor may be between 0 and 1 and may be based on the level of ambient noise estimated by the spectral subtraction method.

In one embodiment, the noise control processing component $230_1$ includes a memory device and a processor. The memory device may include one or more different types of storage such as hard disk drive storage, nonvolatile memory, and volatile memory such as dynamic random access memory. The processor may be a microprocessor, a microcontroller, a digital signal processor, or a central processing unit. The term "processor" may refer to a device having two or more processing units or elements, e.g. a CPU with multiple processing cores. The processor may be used to control the operations of the noise estimator 310, variable noise target controller 320, gain controller 340 and combiner 350 by executing software instructions or code stored in the memory device.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
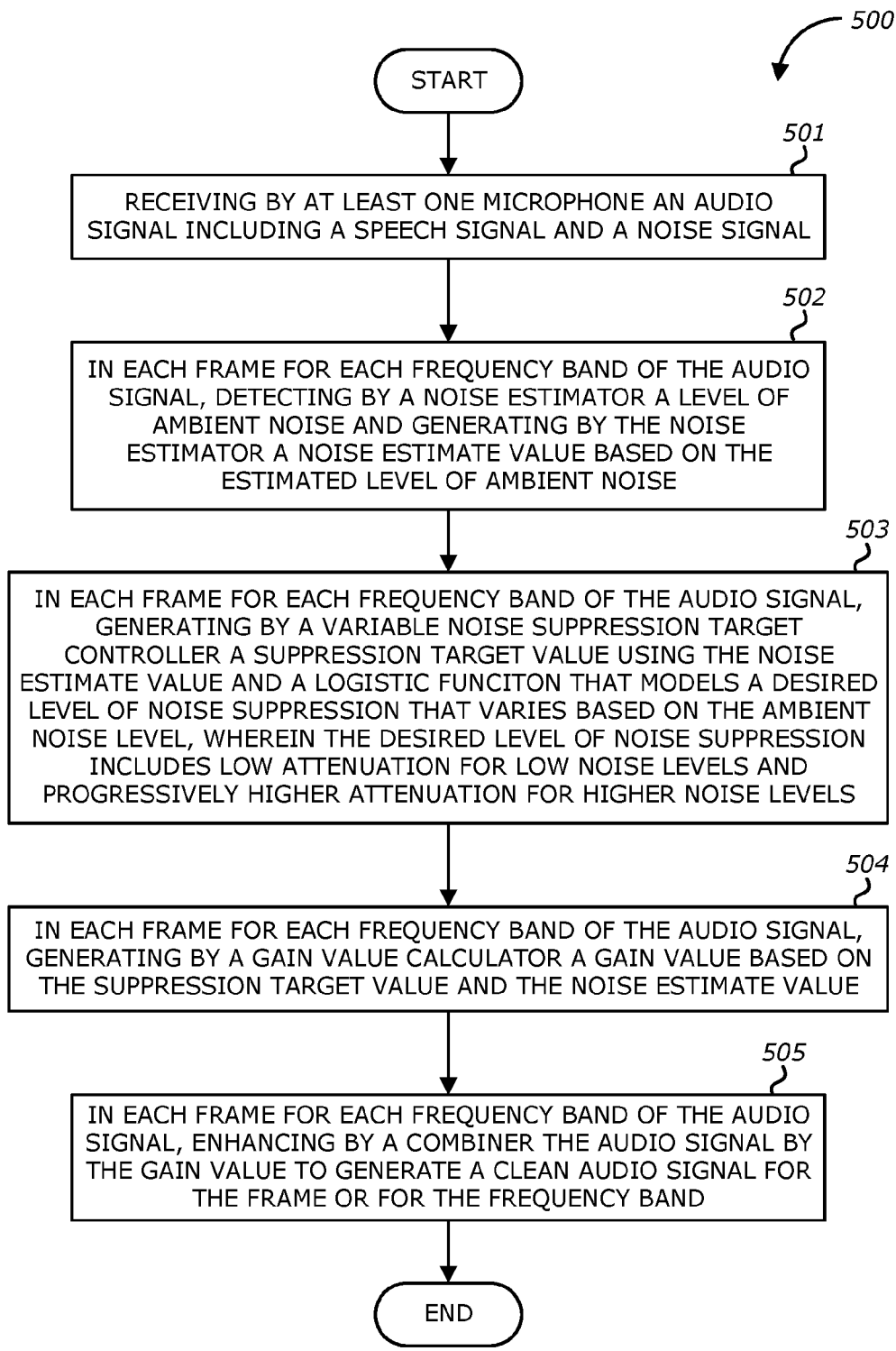
FIG. 5 illustrates a flow diagram of an example method for audio processing and noise reduction according to an embodiment of the invention.

FIG. 5 illustrates a flow diagram of an example method 500 for improving noise suppression for automatic speech recognition (ASR) according to an embodiment of the invention. The method 500 starts with at least one microphone receiving an audio signal including a speech signal and a noise signal at Block 501. In each frame for each frequency band of the audio signal, a noise estimator detects a level of ambient noise and generates a noise estimate value based on the estimated level of ambient noise at Block 502. The noise estimator may be a one-channel noise estimator or a two-channel noise estimator. In each frame for each frequency band of the audio signal, at Block 503, a variable noise suppression target controller generates a suppression target value using the noise estimate value and a logistic function that models a desired level of noise suppression that varies based on the ambient noise level. The variable level of noise suppression includes low attenuation for low noise levels and progressively higher attenuation for higher noise level. At Block 504, in each frame for each frequency band of the audio signal, a gain value calculator generates a gain value based on the suppression target value and the noise estimate value. At Block 505, in each frame for each frequency band of the audio signal, a combiner enhances the audio signal by the gain value to generate a clean audio signal for the frame or for the frequency band.

In one embodiment, a frequency analyzer receives the audio signal from the at least one microphone, and splits the audio signal for each frame into a plurality of frequency bands. In this embodiment, a signal synthesizer combines the clean audio signals for each frame from all frequency bands to generate a clean audio output signal for ASR processing.

Figure 6:
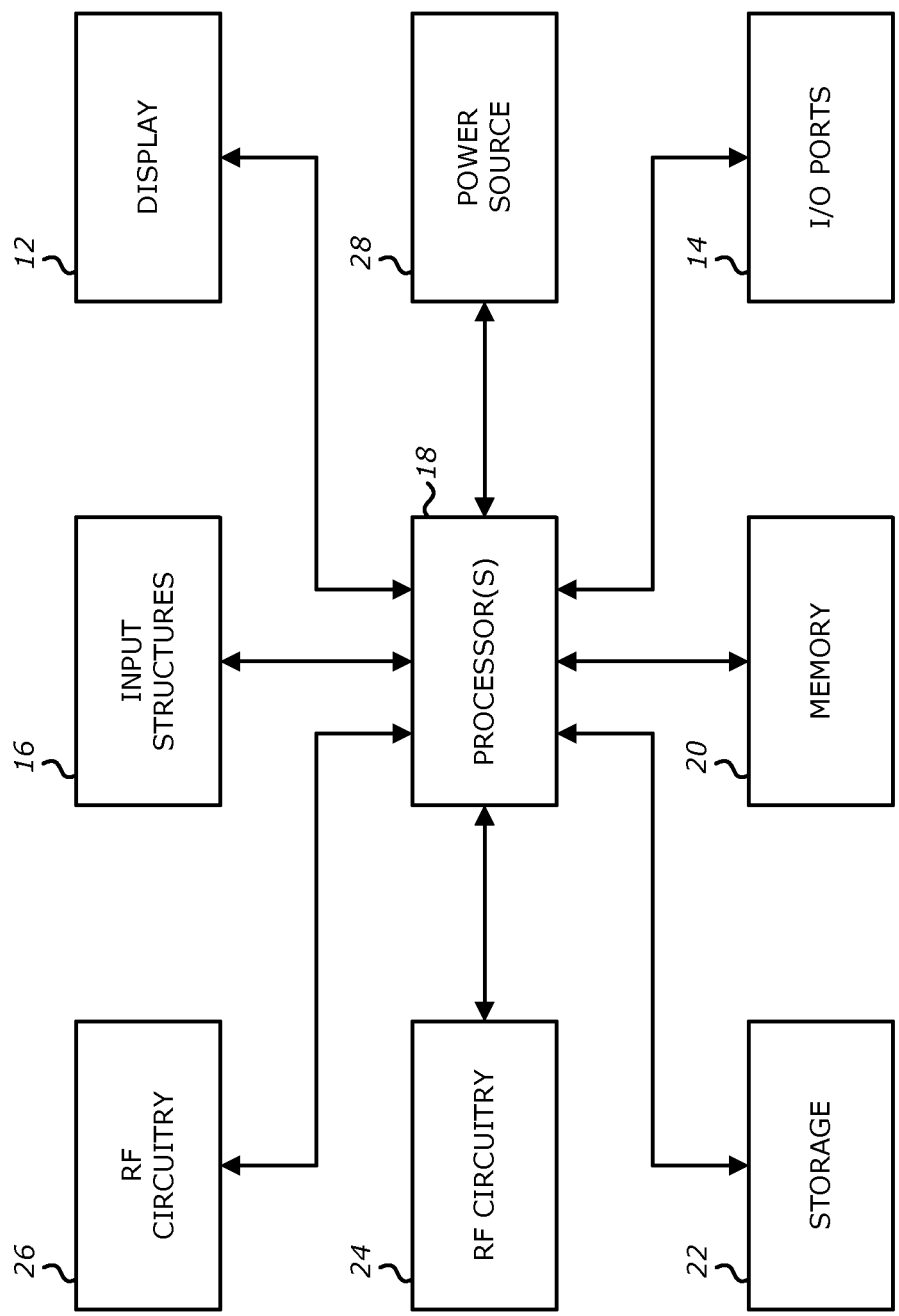
FIG. 6 is a block diagram of exemplary components of an electronic device processing a user's voice in accordance with aspects of the present disclosure.

A general description of suitable electronic devices for performing these functions is provided below with respect to FIG. 6. Specifically, FIG. 6 is a block diagram depicting various components that may be present in electronic devices suitable for use with the present techniques. The electronic device may be in the form of a computer, a handheld portable electronic device, and/or a computing device having a tablet-style form factor. These types of electronic devices, as well as other electronic devices providing comparable speech recognition capabilities may be used in conjunction with the present techniques.

Keeping the above points in mind, FIG. 6 is a block diagram illustrating components that may be present in one such electronic device 10, and which may allow the device 10 to function in accordance with the techniques discussed herein. The various functional blocks shown in FIG. 6 may include hardware elements (including circuitry), software elements (including computer code stored on a computer-readable medium, such as a hard drive or system memory), or a combination of both hardware and software elements. It should be noted that FIG. 6 is merely one example of a particular implementation and is merely intended to illustrate the types of components that may be present in the electronic device 10. For example, in the illustrated embodiment, these components may include a display 12, input/output (I/O) ports 14, input structures 16, one or more processors 18, memory device(s) 20, non-volatile storage 22, expansion card(s) 24, RF circuitry 26, and power source 28.

In the embodiment of the electronic device 10 in the form of a computer, the embodiment include computers that are generally portable (such as laptop, notebook, tablet, and handheld computers), as well as computers that are generally used in one place (such as conventional desktop computers, workstations, and servers).

The electronic device 10 may also take the form of other types of devices, such as mobile telephones, media players, personal data organizers, handheld game platforms, cameras, and/or combinations of such devices. For instance, the device 10 may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the electronic device 10 may also be provided in the form of a portable multi-function tablet computing device. In certain embodiments, the tablet computing device may provide the functionality of media player, a web browser, a cellular phone, a gaming platform, a personal data organizer, and so forth.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components. In one embodiment, the machine-readable medium includes instructions stored thereon, which when executed by a processor, causes the processor to perform the method for improving noise suppression for automatic speech recognition (ASR) by using a logistic function that models a desired level of noise suppression that varies based on ambient noise level as described above.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A method for improving noise suppression for automatic speech recognition (ASR) comprising:
   receiving by at least one microphone an audio signal including a speech signal and a noise signal; and
   in each frame for each frequency band of the audio signal,
   detecting by a noise estimator a level of ambient noise and generating a noise estimate value based on the estimated level of ambient noise,
   generating a suppression target value by a variable noise suppression target controller using the noise estimate value and a logistic function that models a desired level of noise suppression that varies based on the ambient noise level, wherein the logistic function models the desired level of noise suppression to includes low attenuation for low ambient noise levels and progressively higher attenuation for higher ambient noise level,
   generating a gain value by a gain value calculator based on the suppression target value and the noise estimate value, and
   enhancing by a combiner the audio signal by the gain value to generate a clean audio signal for the frequency band.

2. The method of claim 1, further comprising:
   receiving by a frequency analyzer the audio signal from the at least one microphone, and
   splitting the audio signal into a plurality of frequency bands.

3. The method of claim 2, further comprising:
   combining by a signal synthesizer the clean audio signals in each frame from all frequency bands to generate a clean audio output signal for ASR processing.

4. The method of claim 3, further comprising:
   receiving by a beamformer the audio signal from at least two microphones; and
   steering the beamformer to capture a main speech signal.

5. The method of claim 4, further comprising:
outputting from the beamformer the main speech signal to an amplifier; and
outputting from the amplifier an amplified main speech signal to an automatic gain controller.

6. The method of claim 1, wherein the noise estimator is a one-channel noise estimator or a two-channel noise estimator.

7. A method for improving automatic speech recognition (ASR) using a logistic function that models a desired level of noise suppression that varies based on ambient noise level comprising:
receiving by at least one microphone an audio signal including a speech signal and a noise signal; and
in each frame of the audio signal,
detecting by a noise estimator a level of ambient noise and generating a single noise estimate value from all the frames based on the estimated level of ambient noise in each frequency band,
generating a single suppression target value by a variable noise suppression target controller using the noise estimate value and the logistic function that models the level of noise suppression that varies based on the ambient noise level, wherein the logistic function models the desired level of noise suppression to include low attenuation for low ambient noise levels and progressively higher attenuation for higher ambient noise level,
generating a gain value by a gain value calculator based on the suppression target value and the noise estimate value, and
enhancing by a combiner the audio signal by the gain value to generate a clean audio signal in the frame.

8. The method of claim 7, further comprising:
receiving by a frequency analyzer the audio signal from the at least one microphone, and
splitting the audio signal into a plurality of frequency bands.

9. The method of claim 8, further comprising:
combining by a signal synthesizer the clean audio signals in each frame from all frequency bands to generate a clean audio output signal for ASR processing.

10. The method of claim 9, further comprising:
receiving by a beamformer the audio signal from at least two microphones;
steering the beamformer to capture a main speech signal;
outputting from the beamformer the main speech signal to an amplifier;
outputting from the amplifier the main speech signal to an automatic gain controller; and
outputting from the automatic gain controller the main speech signal to the frequency analyzer.

11. The method of claim 7, wherein the noise estimator is a one-channel noise estimator or a two-channel noise estimator.

12. A non-transitory computer-readable storage medium, having stored thereon instructions, which when executed by a processor, causes the processor to perform a method for improving noise suppression for automatic speech recognition (ASR), the method comprising:
receiving an audio signal including a speech signal and a noise signal; and
in each frame for each frequency band of the audio signal,
detecting a level of ambient noise and generating a noise estimate value based on the estimated level of ambient noise,
generating a suppression target value using the noise estimate value and a logistic function that models a desired level of noise suppression that varies based on the ambient noise level, wherein the logistic function models the desired level of noise suppression to includes low attenuation for low ambient noise levels and progressively higher attenuation for higher ambient noise level,
generating a gain value based on the suppression target value and the noise estimate value, and
enhancing the audio signal by the gain value to generate a clean audio signal in each frame for each frequency band.

13. The non-transitory computer-readable storage medium of claim 12, further comprising instructions, which when executed by the processor, causes the processor to:
split the audio signal into a plurality of frequency bands; and
combining the clean audio signals in each frame from all frequency bands to generate a clean audio output signal for ASR processing.

14. A system for improving noise suppression for automatic speech recognition (ASR) comprising:
a noise estimator
to estimate a level of ambient noise in each frame for each frequency band of an audio signal, and
to generate a noise estimate value in each frame for each frequency band of the audio signal based on the estimated level of ambient noise, wherein the audio signal includes a speech signal;
a variable noise suppression target controller
to generate a suppression target value in each frame for each frequency band of the audio signal using the noise estimate value and a logistic function that models a desired level of noise suppression that varies based on the ambient noise level,
wherein the desired level of noise suppression includes low attenuation for low ambient noise levels and progressively higher attenuation for higher ambient noise level;
a gain calculator
to generate a gain value in each frame for each frequency band of the audio signal based on the suppression target value and the noise estimate value; and
a combiner
to enhance the audio signal in each frame for each frequency by the corresponding gain value to generate a clean audio output signal in each frame for each frequency.

15. The system of claim 14, further comprising:
a frequency analyzer to receive the audio signal from at least one microphone, and to split the audio signal into a plurality of frequency bands.

16. The system of claim 15, further comprising:
a signal synthesizer to combine the clean audio signals in each frame from all frequency bands to generate a clean audio output signal for ASR processing.

17. The system of claim 16, further comprising:
at least one beamformer coupled to at least two microphone, respectively, to receive the audio signal from the at least two microphones, respectively, and to output a main speech signal.

18. The system of claim 17, further comprising:
an amplifier coupled to the at least one beamformer and an automatic gain controller, the amplifier to receive and amplify the main speech signal from the at least one beamformer, and to output an amplified main speech signal to the automatic gain controller.

19. The system of claim 16, further comprising:
an automatic speech recognition (ASR) engine to receive the clean audio output signal from the signal synthesizer and to perform ASR on the clean audio output signal.

20. The system of claim 14,
wherein the noise estimator is a one-channel noise estimator or a two-channel noise estimator.

* * * * *